June 17, 1924. 1,497,789
M. PEARSON
AIRCRAFT
Filed Feb. 5, 1923 5 Sheets-Sheet 3
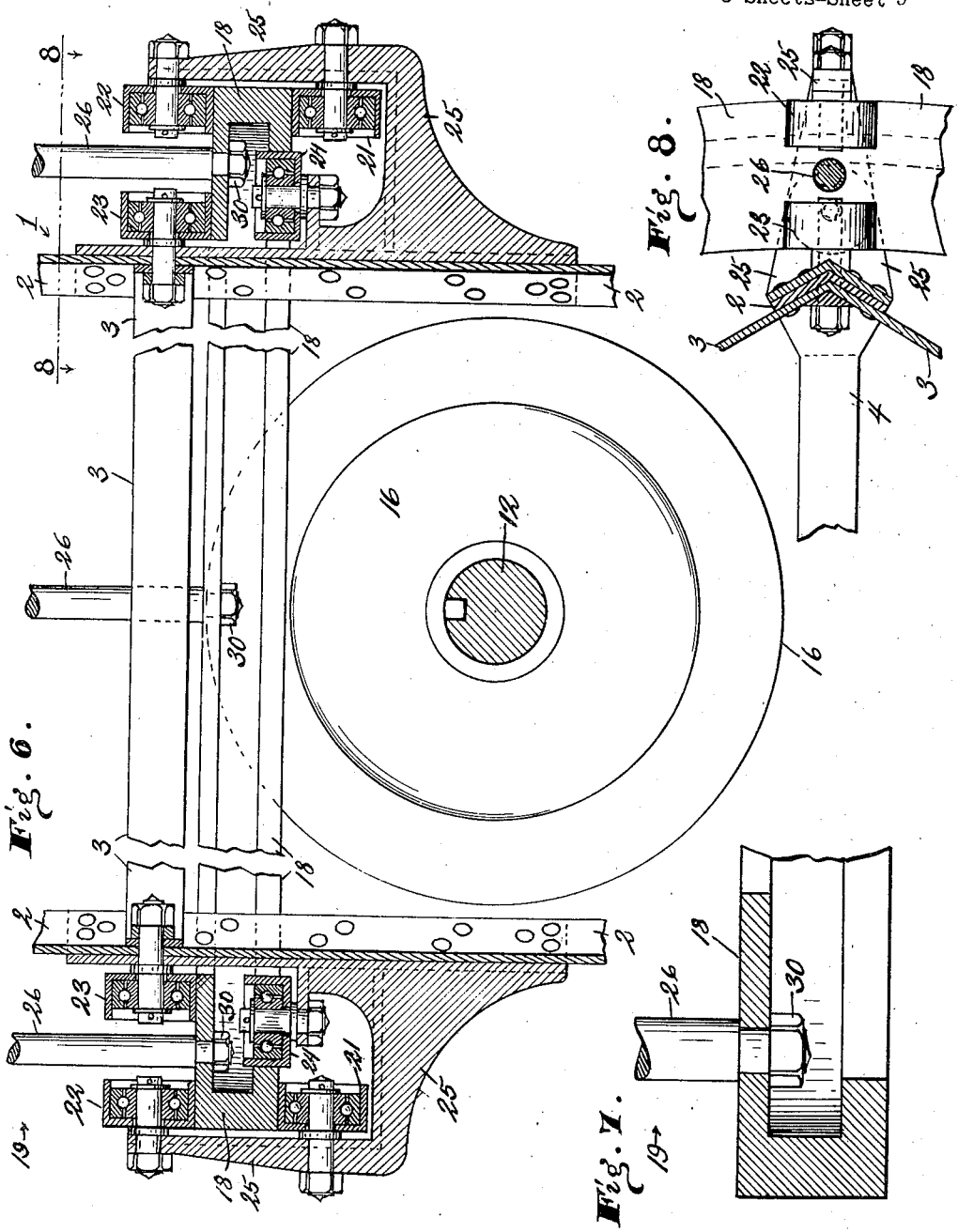
Inventor.
Martin Pearson.
by William M. Gentle,
his Attorney.
Witness:
Thomas J. Gentle.

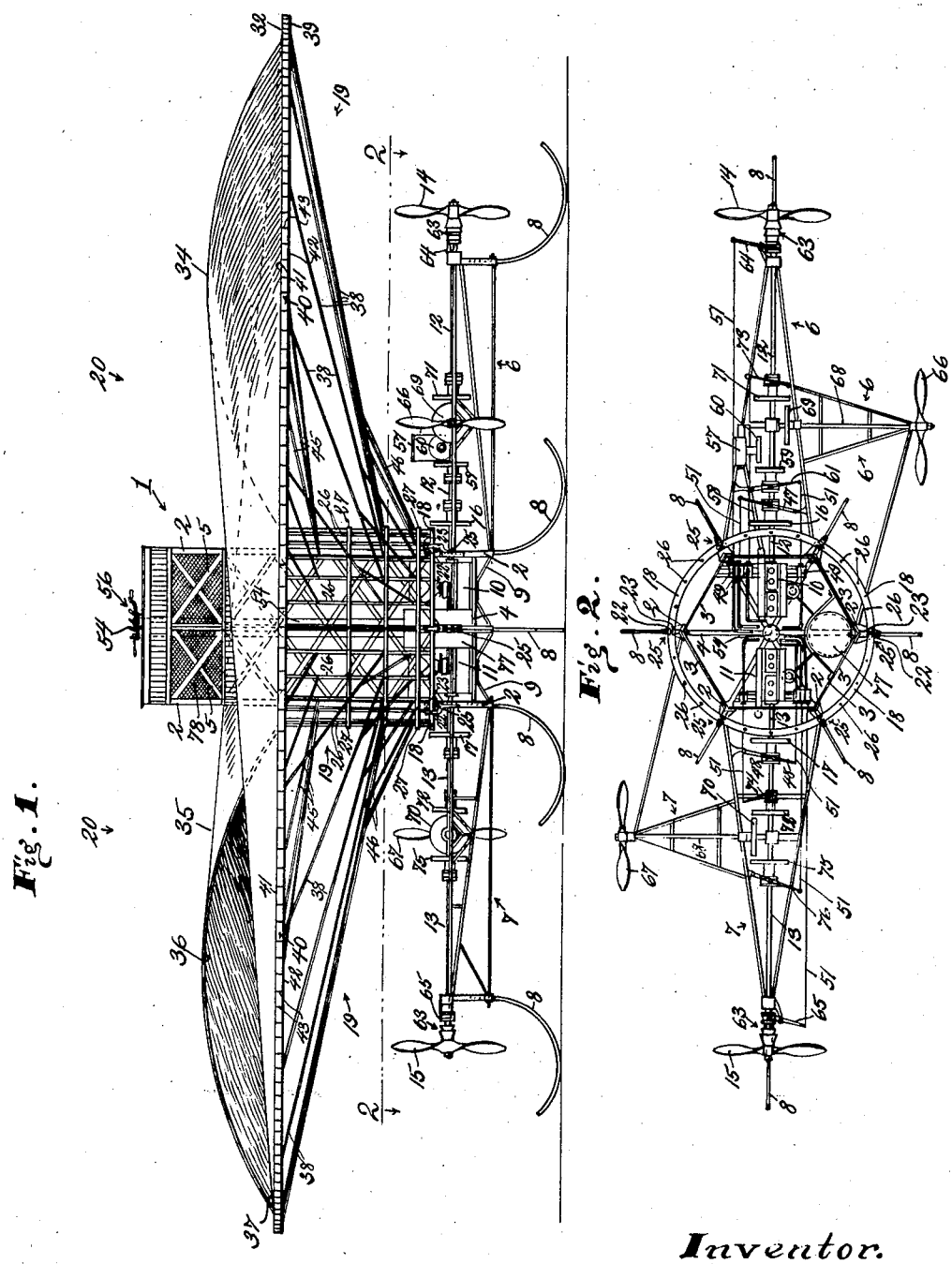

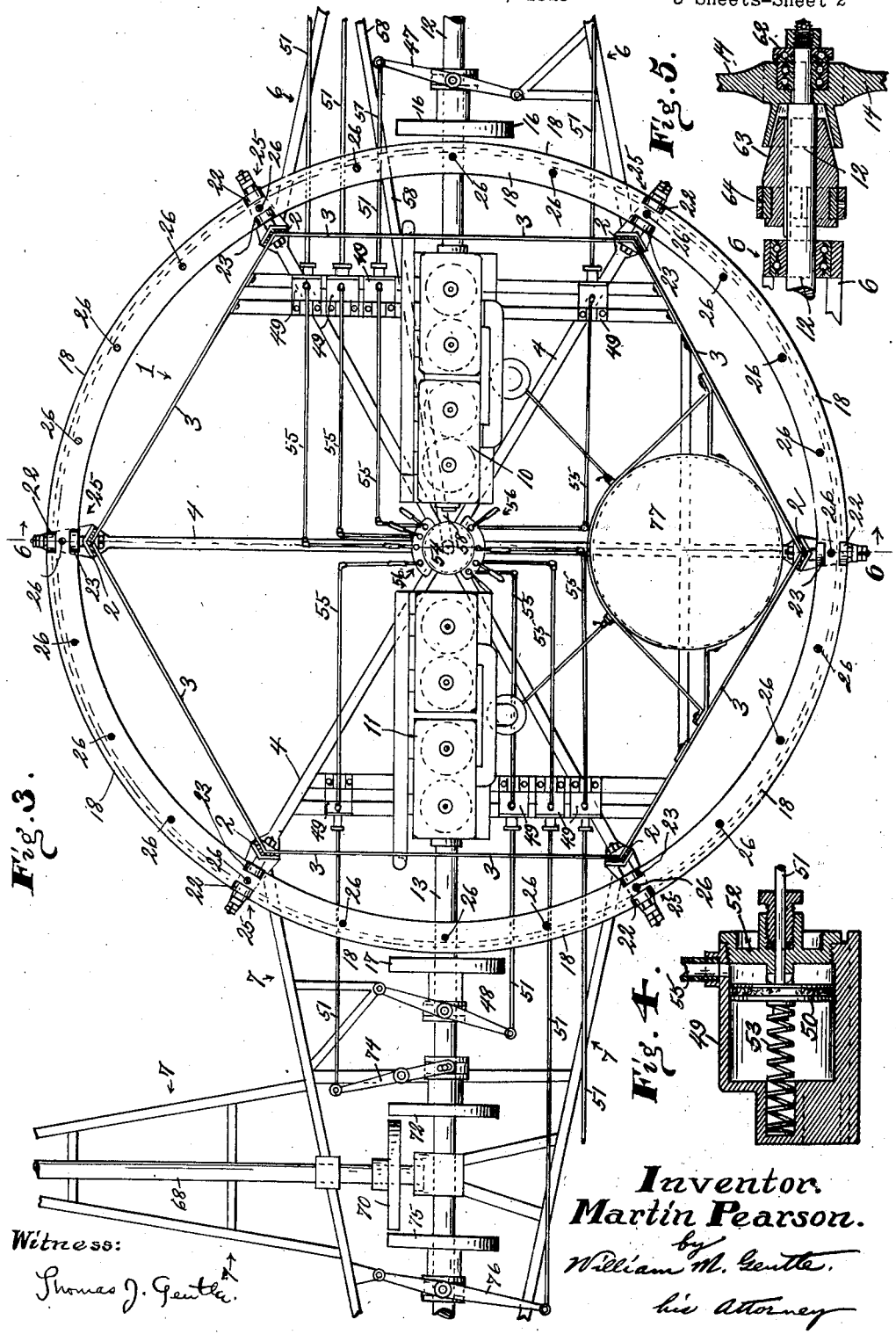

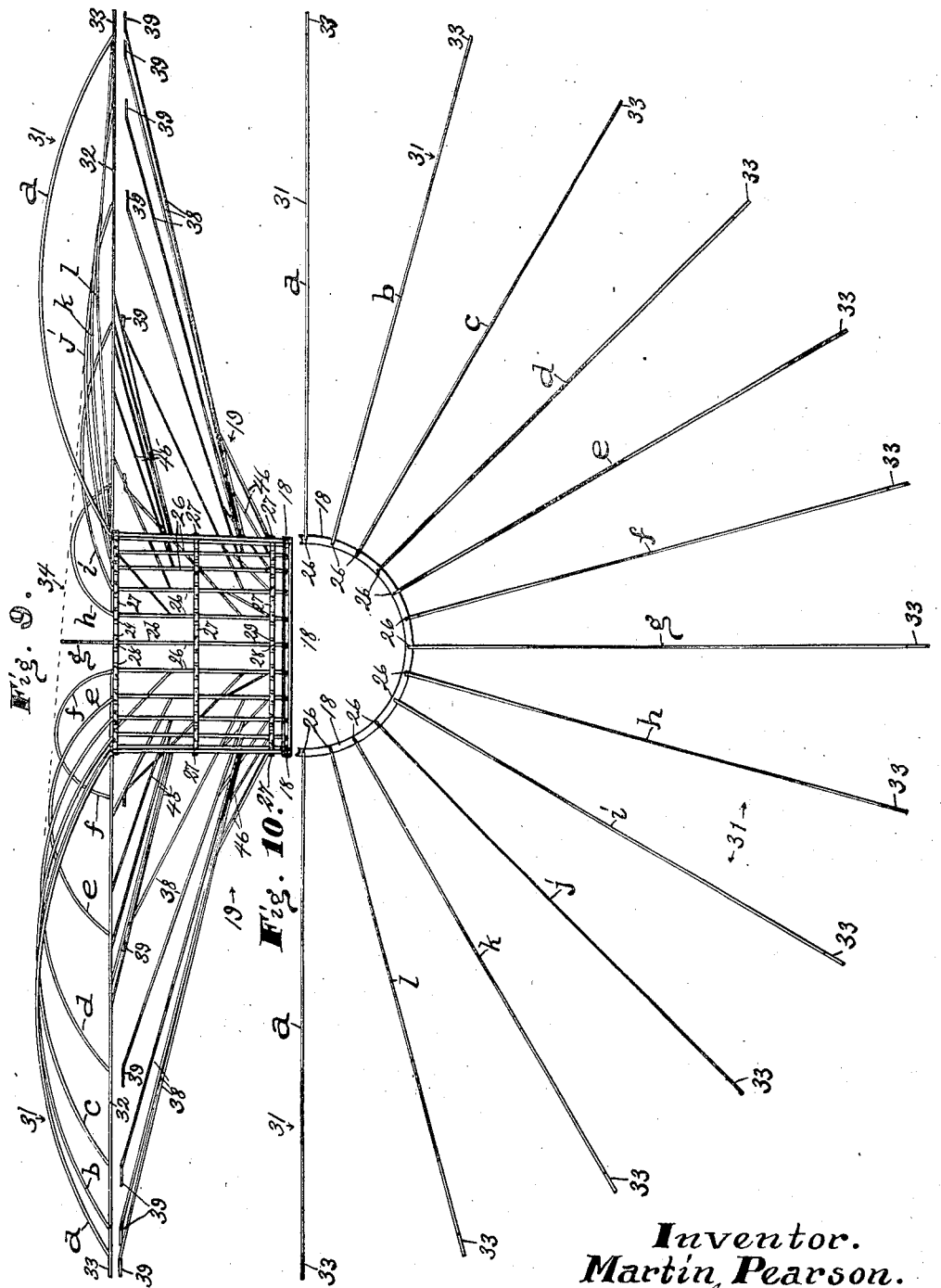

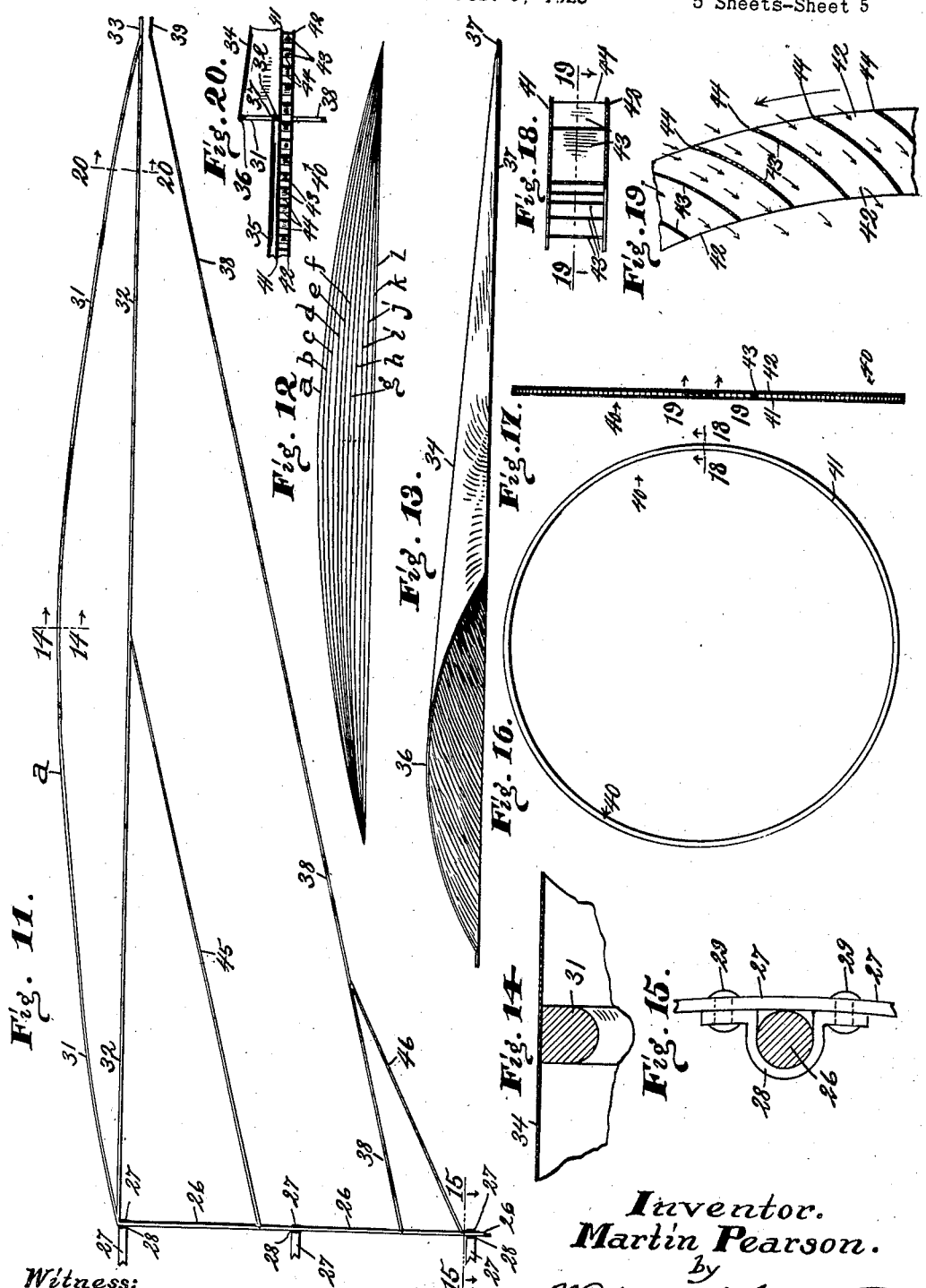

Patented June 17, 1924.

1,497,789

UNITED STATES PATENT OFFICE.

MARTIN PEARSON, OF LOS ANGELES, CALIFORNIA.

AIRCRAFT.

Application filed February 5, 1923. Serial No. 617,047.

*To all whom it may concern:*

Be it known that I, MARTIN PEARSON, a citizen of the United States, residing at Los Angeles, in the county of Los Angeles, and State of California, have invented a new and useful Aircraft, of which the following is a specification.

This invention relates to means for aerial transportation and travel and an object of the invention is to provide an appliance that can ascend vertically and then travel off horizontally in any direction or course stop in mid-air and remain stationary at predetermined elevations for long periods of time; and then descend directly downward and land at any desired place with perfect east and safety to the aviator and passengers. To that end I provide an appliance in which I combine a vertical lift propeller of a helicopter type with a locomotion propeller of an aircraft type in which combination the helicopter propeller also functions as a parachute; and for this additional use it is made of such extent and form that it can easily support the aircraft against a rapid descend when the lifting and locomotion propellers are at rest. In other words the descent of the aircraft is made easy, floating and gradual by the parachute propeller when the engines are idle and the propellers at rest.

Another object of this invention is to provide an aircraft that can travel horizontally at great speed; to that end I provide an appliance with both forward and rear propellers that are utilized to drive the aircraft horizontally; and these propellers are driven by separate engines. Also I provide means by which either one or the other of the engines can be utilized while driving a horizontal propeller to also drive the helicopter propeller for ascending vertically; or for holding the appliance in a horizontal plane at a predetermined height while being propelled horizontally.

Another object of the invention is to provide an aircraft that can be easily and quickly maneuvered to turn, change its course, or elevation. To that end, I provide a forward and rear flank propeller that can be driven at great speed to alter the course of the appliance; and either of these flank propellers can be used separately or both together for steering the aircraft. By means of the flank propellers the aircraft can be turned around in a circle not much larger than its largest outer dimensions and at great speed; which has not been possible with aircraft as constructed heretofore.

A feature of the invention is shown in the novel construction of the helicopter propeller and the means for operating it.

Another feature of the invention is shown in the stabilizing means connected with the helicopter propeller.

Another feature of the invention is shown in the novel means for actuating the clutches controlling the propellers.

Features of the invention are shown in the construction, combination and arrangement of the parts in combination with driving means whereby an aircraft can be moved upward vertically and horizontally simultaneously.

Other objects, advantages and features of invention may appear from the accompanying drawings, the subjoined detail description and the appended claims.

The accompanying drawings illustrate the invention. On account of the large size of the aircraft many of the parts that are of well known construction are shown diagrammatically in several of the views, for the sake of brevity.

Figure 1 is a side elevation of an aircraft constructed in accordance with this invention, showing it at rest.

Fig. 2 is a section on line 2—2, Fig. 1; showing a plan view of the lower portion of the appliance.

Fig. 3 is an enlargement of the center portion of what is shown in Fig. 2, parts broken away.

Fig. 4 is a central longitudinal section through one of the compressed air cylinders that are used for actuating the levers controlling the clutches and shifting disks.

Fig. 5 is a longitudinal section through the hub of a horizontal propeller; showing the construction of the clutch for engaging the propeller with the drive shaft.

Fig. 6 is an enlarged fragmental cross section on line 6—6, Fig. 3; many parts omitted; showing in detail the brackets and rollers for supporting the drive ring of the helicopter propeller; parts about half size; also showing the driving disk for engaging and rotating the drive ring.

Fig. 7 is a fragmental cross section through the drive ring of the helicopter propeller; and also showing the lower portion of one of the vertical rods for supporting the wings of the helicopter propeller; parts actual size.

Fig. 8 is a fragmental section on line 8—8 Fig. 6, showing a plan of one of the brackets and associated parts that support the drive ring of the helicopter propeller; parts about half size.

Fig. 9 is a central vertical section through the skeleton frame for supporting the wings of the helicopter propeller.

Fig. 10 is a fragmental plan view of the skeleton frame shown in Fig. 9.

Fig. 11 is a view of a bowed rib and supporting rod detached from the skeleton frame shown in Figs. 9, 10; and also showing the support and braces for strengthening the rib and rod.

Fig. 12 is a diagram illustrating an approximate curvature of the ribs for supporting the wings of the helicopter propeller two sets of which are required.

Fig. 13 is a perspective view of a detached wing of the helicopter propeller.

Fig. 14 is a cross section on line 14—14, Fig. 11, with a fragmental portion of a wing in place on a rib; parts enlarged to full size.

Fig. 15 is a fragmental cross section on line 15—15 of Fig. 11, showing a full sized propeller supporting rod strapped to a cage band.

Fig. 16 is a plan view of a stabilizer that is supported adjacent the outer concentric edges of the propeller wings.

Fig. 17 is an edge view of the stablizer shown in Fig. 16.

Fig. 18 is an enlarged fragmental cross section on line 18—18, Fig. 16.

Fig. 19 is a fragmental section on line 19—19, Fig. 18 showing the air deflecting vanes of the stabilizer.

Fig. 20 is a fragmental section on line 20—20 of Fig. 11 showing the front tip of one wing connected to one of the front ribs; and the rear tip of the other wing connected to the horizontal brace of that rib.

The main frame 1 comprises the upright angle irons 2 that are spaced equidistant apart and an equal radial distance from a common center; and they are connected together by plates 3 so that in plan view the frame is hexagonal. The angle irons 2 are additionally braced from the inside by numerously spaced spiders 4; and by inclined braces 5; by which arrangement of parts a very light and strong frame is formed.

Adjacent the bottom end of frame 1 and extending therefrom in opposite directions are the frame extensions 6, 7, that are braced and cross braced to form a substantial support; and each of the uprights 2 of frame 1 as well as the outer ends of extensions 6, 7 are supported by the resilient curved spring legs 8; that are adapted to yield and prevent excessive shock when the aircraft is landing.

On the bottom spider 4 and supported by the under braces 9 are the oppositely arranged engines 10, 11, that have their crank shafts 12, 13 extended beyond and supported by the extensions 6, 7; and on the outer ends of these shafts are arranged and loosely mounted the horizontal locomotion propellers 14, 15; also connected to the shafts 12, 13 are the driving disks 16, 17 that are adapted to be moved into engagement with the friction ring 18 that carries the support 19 of the helicopter propeller 20.

Ring 18 is supported so that it will rotate around the frame 1 by means of six sets of grouped rollers. Each group consists of four rollers 21, 22, 23, 24 respectively, that are mounted in the brackets 25 secured to the uprights 2 either by rivets or brazing.

The rollers 21 support the ring 18 from downward movement when the aircraft is at rest; and the rollers 22, 23 take the upward thrust of the helicopter propeller and lift the frame 1 and associated parts with the ring 18 when the aircraft is in flight; and the rollers 24 take up the inward thrust when either of the driving disks 16, 17 are moved into driving engagement with the ring 18; and preferably all of the rollers 21, 22, 23, 24 are mounted on either roller or ball bearings so as to reduce their frictional contact with the ring 18.

Spaced equidistant around and secured to the ring 18 are the upright rods 26 preferably 24 in number that are mounted so they can be rotated around an axis; and these rods are secured together by upper, lower and intermediate ring bands 27 which, as best shown in Figs. 11, 15, are secured to the rods 26 by means of straps 28 that are secured to the bands 27 by rivets 29.

The lower ends of the rods 26 are secured to the ring 18 by nuts 30 as best shown in Figs. 6, 7, 8.

Welded or brazed to the upper ends of the rods 26 are the inner ends of the bowed ribs 31 that are held in bowed position by the horizontal braces 32 that have their inner and outer ends integral with the ends of the ribs; and the ribs 31 have flattened upper surfaces as shown on the rib in Fig. 14 to which the respective metallic wings 34, 35 are secured by brazing. Each wing 34, 35 is supported by its respective set of 12 ribs and the curvature of a set of ribs is shown approximately in Fig. 12. As seen therein the front rib $a$ has the greatest upward bow; and the ribs $b$—$c$—$d$—$e$—$f$—$g$—$h$—$i$—$j$—$k$—$l$ are proportionately decreased in curvature that conform to the curvature of the wings.

The wings 34, 35 have forward tips 36 that are brazed to the front ribs $a$ that as stated have the greatest upward bow or curvature; and from the forward tips 36 the wings are inclined downwardly and rearwardly and decrease in curvature to the rib $l$ from where they are extended to terminate in flat rear tips 37 that are directly under the tips 36 and which lie in the same plane as the chord of the concavo-convexed curvature of the wings; and the tips 37 are brazed to the horizontal braces 32 that extend under and have their ends integral with the ribs *a;* so that from the ribs *l* to the cross braces 32 the wings are practically flat.

Near the lower ends of the upright rods 26 are secured the lower ends of the braces 38 that are inclined upward to a point adjacent the outer end of the horizontal braces 32 where a portion 39 of the braces 38 are bent to extend parallel with the ends 33 of the braces 32; and between the horizontal portions 39 and the ends of the braces 32 is secured the stabilizer 40.

This stabilizer comprises parallel annular sheet metal ring plates 41, 42 between which are secured the curved vanes 43 that have outer edges 44 adapted to cut into the air and deflect it inward toward the vertical axis of the aircraft when the helicopter propeller is in action as illustrated by arrows in Fig. 19.

The stabilizer 40 extends entirely around the aircraft adjacent the outer edges of the semi-circular wings 34, 35, and it is provided with a large number of equally spaced, curved vanes 43 that cause an even flow of air from the outer circumference of the stabilizer toward the vertical axis of the aircraft to prevent its unbalancing when in motion.

The annular plates 42, 43 are brazed to the respective parts 33, 39 by which construction and arrangement of parts a very strong structure is formed.

Additional supporting strength is added to the helicopter propeller by the inclined braces 45, 46. Brace 45 connects the rods 26 with the center portion of the horizontal braces 32, and the braces 46 extend from near the bottom ends of rods 26 to intersect the braces 38 at about one-fifth their length from the rods 26, by which construction, combination and arrangement of parts a very strong and substantial driving connection is formed between the ring 18 and the helicopter wings 34, 35.

The helicopter propeller 20 is driven by either of the engines 10, 11 by means of the friction disks 16, 17 on the shafts 12, 13 that are movable into engagement with the ring 18 by the respective levers 47, 48; and when the propeller 20 is rotated the upward bowed front tips 36 of the wings 34, 35 cut into the air and drives it against the downward inclined curved surface of the wings causing them to glide upward in the air to lift the aircraft vertically; and coincident with the action of the wings 34, 35 the curved vanes 43 of the stabilizer 40 are cutting into the air and causing a strong flow of air toward the vertical axis of the aircraft that keeps it in balance as it ascends.

The levers 47, 48 are actuated by air cylinders 49 that have pistons 50 connected by rods 51 to the levers 47, 48. As shown in detail in Figs. 3, 4 there are eight of the cylinders 49 all constructed and operated substantially alike; and as shown in Fig. 4 the pistons 50 are normally held against a stop on the cylinder head 52 by means of springs 53; and the pistons 50 are actuated toward the springs 53 by compressed air from a tank 54 through the pipes 55 controlled by two-way air valves 56 on the upper end of the tank.

When any of the valves 56 are actuated to admit air into the cylinders 49 the pistons 50 are forced against the springs 53 and moves the rods 51 and their respective levers; and when the valves 56 are moved in a reversed direction the supply of compressed air is cut off and pipes 56 opened to the outer air which permits the cylinders to exhaust and the piston to return to normal position under influence of the springs 53 which move the rods 51 and their corresponding levers in a reverse direction.

The construction and operation of the air cylinders and associated parts are old and well known and are therefore not shown or described in complete detail.

The compressed air tank 54 is filled with compressed air by a compressor 57 that is connected to the tank 54 by a pipe 58. The compressor 57 is driven by the engine 10 whenever the tank 54 needs recharging by means of a sliding disk drive wheel 59 on shaft 12 that is adapted to engage and drive a wheel 60 on the compressor; and the disk 59 is actuated by means of a lever 61 connected as described to one of the air cylinders 49, see Figs. 1, 2. Also the means for charging the air tank are old and well known and are shown only diagrammatically.

As previously stated the crank shafts 12, 13 of the engines 10, 11 are extended out to and slightly beyond the ends of the frame extensions 6, 7 and on the extending ends of these shafts are loosely mounted the aircraft locomotion propellers 14, 15 and preferably the mounting of these propellers is as shown in detail in Fig. 5. As seen therein the end of shaft 12 is reduced for the ball bearing 62 that is constructed to reduce frictional rotation on the shaft 14 and to also relieve the end thrust on the propeller hub when the clutch 63 is actuated by the lever 64 to clutch the propeller 14 into driving engagement with the shaft 12; and the mounting and operation of both the propellers 14, 15 and their clutches and levers 64, 65 are substantially alike.

By the foregoing construction the propellers 14, 15 can be driven either separately or both together to drive the aircraft horizontally while it is ascending vertically or supported in elevated position by the helicopter propeller 20.

Flank propellers 66, 67 are provided for turning the aircraft from a horizontal course. These propellers 66, 67 are mounted on jack shafts 68 that have disks 69, 70 that are adapted to be engaged by the driving disks 71, 72 on the shafts 12, 13; and these driving disks are movable into engagement with disks 69, 70 by levers 73, 74 that are actuated by air cylinders 49 previously described; and when the disks are engaged and the engines running the propellers 66, 67 rotate the frame of the aircraft in arcs of a circle. It is understood of course that they can be used to turn the frame entirely around or move it more or less out of a horizontal course.

The propeller 67 is reversed by means of a disk 75 on shaft 13 that is mounted in position to engage the disk 72 oppositely to the engagement of disk 70 and this disk is actuated by a lever 76 connected to one of the air cylinders 49.

The engines are supplied with fuel from a tank 77; and the engine and associated parts can be of any well known type suited to aircraft operation.

The aircraft is preferably operated from a basket 78 in the upper part of the frame 1 where the aviator and passengers can have a wide vision around the appliance.

By means of the foregoing described construction, combination and arrangement of parts an aircraft is provided that can ascend vertically and remain practically stationary at predetermined elevations or move off horizontally while ascending or descending. Also in descending the great wings of the helicopter propeller function as a parachute to make the descend easy, gradual and safe to passengers and aviator.

I claim.

1. The aircraft set forth comprising a pair of oppositely disposed semi-circular wings having outer and inner concentric edges lying in the same plane said wings having forward tips bowed upward and their rear tips flattened; vertical rods arranged in a circle and adapted to be driven around an axis, and connected to the inner edges of said wings; inclined braces from said rods supporting the outer edges of said wings; and means for driving said rods to actuate said wings to lift the aircraft vertically.

2. The aircraft set forth comprising a pair of oppositely disposed semi-circular wings having outer and inner concentric edges lying in the same plane said wings having forward tips bowed into a concavo-convexed curve and said wings gradually reduced in curvature and inclined from their front tips rearwardly and downwardly until they terminate in flat rear tips; vertical rods arranged to rotate around an axis and adapted to be driven to actuate said wings, said rods connected to and supporting the inner edges of said wings; inclined braces from said rods supporting the outer edges of said wings; and means for driving said rods to actuate said wings to lift the aircraft vertically.

3. The aircraft set forth comprising a pair of oppositely disposed semi-circular metallic wings having outer and inner concentric edges that are spaced equidistant apart and that lie in the same plane said wings having front and rear tips arranged so that the front tip of each wing is adjacent the rear tip of the opposite wing; a frame; a ring supported by said frame; vertical rods on said wings connected to and supporting the inner edges of said wings; inclined braces from said rods supporting the outer edges of said wings and means for actuating said ring to drive said wings to lift the aircraft vertically.

4. The aircraft set forth comprising a pair of oppositely disposed semi-circular wings having outer and inner concentric edges that lie in the same plane and arranged so that the terminal points of the respective edges are joined together and said wings having front tips bowed upward into a concavo-convexed curve and said wings reduced in curvature and inclined from their front tips rearwardly and downwardly until they terminate in flat rear tips; a stabilizer adjacent the outer concentric edges of said wings; and means for actuating said wings and stabilizer to lift the aircraft vertically.

5. The aircraft set forth comprising a pair of wings having front tips bowed upward into a concavo-convexed curve said wings gradually reduced in curvature from their front tips rearwardly until they terminate in extended flat rear tips; a frame; a support for said wings; a rotatable connection between said frame and support; and a driving means on said frame for actuating said wings to lift the aircraft vertically.

6. The aircraft set forth comprising a pair of oppositely disposed wings having concavo-convexed front tips said wings gradually reduced in concavo-convexed curvature from their front tips rearwardly until they terminate in extended flat rear tips that are arranged to lie in the same plane as the chord of the concavo-convexed curvature of the wings; a frame; a ring supported by said frame; a support on said ring for said wings; and a driving means on said frame for engaging said ring and actuating said wings to lift an aircraft vertically.

7. The aircraft set forth comprising a pair of oppositely disposed semicircular wings having outer and inner concentric edges lying in the same plane said wings having forward tips bowed upward and rear tips flattened; a frame; a ring supported by said frame; a support for said wings; an engine on said frame; a shaft extended from said engine; a friction disk on said shaft for engaging said ring; means for moving said disk into engagement with said ring to actuate said wings to lift the aircraft vertically.

8. The aircraft set forth having a helicopter propeller; means for driving said propeller; a stabilizer attached to the helicopter propeller; and comprising vanes for deflecting air toward the vertical axis of the aircraft.

9. The aircraft set forth having a helicopter propeller; wings on said propeller said wings having outer edges; a stabilizer secured to said propeller adjacent the outer edges of said wings; curved vanes for deflecting air toward the vertical axis of said aircraft; and means for driving said propeller to lift said aircraft.

10. The aircraft set forth having a helicopter propeller; wings on said propeller said wings having upwardly bowed front tips from which the wings incline rearwardly and downwardly until they terminate in flat rear tips and said wings having outer concentric edges; a stabilizer connected to said propeller adjacent the outer concentric edges of said wings; curved vanes adapted to deflect air toward the vertical axis of said aircraft; and means for actuating said propeller to lift said aircraft vertically.

11. The aircraft set forth having a helicopter propeller; wings on said propeller said wings having upwardly bowed front tips from which the wings incline rearwardly and downwardly until they terminate in flat rear tips and said wings having outer concentric edges; a stabilizer connected to said propeller adjacent the outer concentric edges of said wings; curved vanes adapted to deflect air toward the vertical axis of said aircraft; means for actuating said helicopter propeller to lift said aircraft vertically; locomotion propellers for moving said aircraft horizontally; and flank propellers for turning said aircraft from a horizontal course said means adapted to actuate all of said propellers..

12. The aircraft set forth comprising a frame; curved spring legs for supporting the aircraft when it is landing or at rest on the ground; a ring; rollers on said frame for supporting said ring in position to rotate around said frame; vertical rods having their lower ends secured to said ring; ribs having inner ends connected to the upper ends of said rods; braces extending from said rods for supporting the outer ends of said ribs; oppositely disposed wings secured to said ribs said wings and support forming a propeller for lifting the aircraft vertically; an engine in said frame for driving said propeller; and other means driven by said engine for guiding and propelling said aircraft.

13. The aircraft having a frame; springs on the bottom end of said frame for yieldingly supporting the aircraft when at rest; a ring encircling said frame; rollers on said frame for supporting said ring in position to revolve around said frame; vertical rods having their lower ends secured to said ring; upper, lower and intermediate ring bands secured to said rods; ribs having inner ends secured to the upper ends of said rods said ribs equidistant apart and extending radially from a common center; braces extending from said rods to support the outer ends of said ribs; oppositely disposed wings secured to said ribs said wings having upwardly bowed front tips and inclined downward and rearwardly and terminate in flat rear tips; a stabilizer adjacent the outer ends of said ribs said stabilizer adapted to deflect air inwardly toward the vertical axis of the aircraft; and means for rotating said wings around the vertical axis of the aircraft to lift it vertically.

14. The aircraft having a frame; resilient means for supporting said frame when the aircraft is at rest; a revoluble ring encircling said frame; rollers on said frame supporting said ring; a propeller on said ring for lifting said frame vertically; engines in the bottom of said frame said engines having extended crank shafts; friction disks on said crank shafts that are movable into driving engagement with said ring; levers for moving said friction disks; propellers loosely mounted on the extended ends of the crank shafts, said propellers adapted to move said frame horizontally; clutches for engaging said propellers with the crank shafts; levers for actuating said clutches; jack shafts on said frame; friction disks secured to said jack shafts; friction disks on said crank shafts movable into engagement with the friction disks of said jack shafts; levers for moving the friction disks on said crank shaft into engagement with the friction disks on said jack shafts; flank propellers on said jack shafts for rotating said frame on its vertical axis; and compressed air means for actuating all of said levers.

In testimony whereof, I have hereunto set my hand at Los Angeles, California, this 30th day of January, 1923.

MARTIN PEARSON.

Witness:
    ELLEN CATE.